United States Patent
Marti et al.

(10) Patent No.: US 8,484,564 B1
(45) Date of Patent: Jul. 9, 2013

(54) METHOD, SYSTEM, AND GRAPHICAL USER INTERFACE FOR PERSONALIZED ONLINE SPORTS TEAM CHARTS

(75) Inventors: Sergio Marti, Sunnyvale, CA (US); Orkut Buyukkokten, Mountain View, CA (US); Nandini Kappiah, Sunnyvale, CA (US); Divya Shah, Sunnyvale, CA (US); Richard Engelberg, Portland, OR (US); Jesse Stollak, Portland, OR (US)

(73) Assignee: Google Inc., Mountain View, CA (US)

( * ) Notice: Subject to any disclaimer, the term of this patent is extended or adjusted under 35 U.S.C. 154(b) by 1008 days.

(21) Appl. No.: 11/683,374

(22) Filed: Mar. 7, 2007

Related U.S. Application Data

(60) Provisional application No. 60/780,328, filed on Mar. 7, 2006.

(51) Int. Cl.
*G06F 3/00* (2006.01)
*G06F 17/00* (2006.01)

(52) U.S. Cl.
USPC .................................. 715/733; 463/42

(58) Field of Classification Search
USPC .................... 715/733, 753; 463/42, 40
See application file for complete search history.

(56) References Cited

U.S. PATENT DOCUMENTS

| | | | | |
|---|---|---|---|---|
| 6,152,821 A * | 11/2000 | Nakagawa et al. | ............... | 463/4 |
| 6,280,323 B1 * | 8/2001 | Yamazaki et al. | ................ | 463/4 |
| 6,371,855 B1 * | 4/2002 | Gavriloff | ........................ | 463/42 |
| 6,491,582 B1 * | 12/2002 | Toyohara et al. | ................ | 463/1 |
| 7,234,117 B2 * | 6/2007 | Zaner et al. | .................... | 715/758 |
| 7,300,345 B2 * | 11/2007 | Mifune et al. | ..................... | 463/4 |
| 7,342,587 B2 * | 3/2008 | Danzig et al. | ................. | 345/473 |
| 7,390,254 B2 * | 6/2008 | Hirai | ................................. | 463/4 |
| 2002/0040253 A1 * | 4/2002 | McNally et al. | ................ | 700/91 |
| 2002/0045485 A1 * | 4/2002 | Tanibuchi et al. | .............. | 463/43 |
| 2002/0183117 A1 * | 12/2002 | Takahashi et al. | .............. | 463/42 |
| 2004/0041836 A1 | 3/2004 | Zaner et al. | ...................... | 345/751 |
| 2005/0177385 A1 | 8/2005 | Hull et al. | ......................... | 705/1 |
| 2006/0217198 A1 * | 9/2006 | Johnson | .......................... | 463/40 |
| 2007/0243918 A1 * | 10/2007 | Wojewoda et al. | ............... | 463/9 |
| 2008/0104103 A1 * | 5/2008 | Adams | .......................... | 707/102 |

FOREIGN PATENT DOCUMENTS

WO WO 2005/072315 A2 8/2005

OTHER PUBLICATIONS

"Yahoo! Sports—NBA—N Orleans/OKC Hornets—Depth Chart," http://web.archive.org/web/20060208071954/http://sports.yahoo.com/nba/teams/nor/depthchart, Feb. 8, 2006, 2 pages.*
"Brands—Dream Team," http://www.ngn.advertising.com/brands_dreamteam.asp, printed Mar. 2, 2006, 1 page.
Sports Mogul Inc., "Baseball Mogul Online Screen Shots," http://www.sportsmogul.com/baseballonline/screenshotspage.htm, 2005, pp. 1-8.

(Continued)

*Primary Examiner* — Rashawn Tillery
(74) *Attorney, Agent, or Firm* — Morgan, Lewis & Bockius LLP

(57) ABSTRACT

A method, system, and graphical user interface for personalized online sports team charts are disclosed. One aspect of the invention involves a graphical user interface on a computer that includes a graphic of an athletic playing field or a portion thereof, and a plurality of player positions on the athletic field. At least some of the player positions contain thumbnail images selected by a first user. The thumbnail images provide links to corresponding profiles in an online social network.

28 Claims, 13 Drawing Sheets

OTHER PUBLICATIONS

Sports Mogul Inc., "Football Mogul Screen Shots," http://www.sportsmogul.com/footballed/screenshotspage.htm, 2005, pp. 1-8.

"Yahoo! Sports—NBA—N Orleans/OKC Hornets—Depth Chart," http://sports.yahoo.com/nba/teams/nor/depthchart, printed Mar. 3, 2006, 1 page.

"Diamond Draft Software—Depth Chart Screen Highlights," http://www.diamonddraft.com/screens/depthchartscreen.html, printed Mar. 3, 2006, 1 page.

"Tea Baggers," http://gafflin.com/tb/, 2000, pp. 1-4.

"KUsports.com—KU Offensive Depth Chart," http://www.kusports.com/multimedia/photogalleries/football/2005/kutt_offense.html, 2005, 1 page.

Said, B.P., "Dream Team 2004-2005," http://ww.bimaprameswara.co.uk/images/dreamteam.jog, 2005, 1 page.

EA Sports—Fussball Manager 06, http://fm06.de/index.php?rubrik=fm2004&seite=entwicklertagebuch9&spalten=1, printed Mar. 2, 2006, pp. 1-3.

"UEFA.com—Team of the Year 2004," http://maniche18.blogs.sapo.pt/arquivo/teamof.jpg, printed Mar. 2, 2006, 20 pages.

WWW.HSU-FOREVER.DE, "Dream Team," http://web522.can13.de/hp/index.php?id=46, 2004, 1 page.

"Life, the Universe and Everything—Football," http://www.exposure.org.uk/members/joey/football.html, printed Mar. 2, 2006, 2 pages.

Soccer for Dummies, "Choosing a Formation in Soccer," http://www.dummies.com/WileyCDA/DummiesArticle/id-644,subcat-sports.html, printed Mar. 2, 2006, pp. 1-7.

WWW.MYSPACE.COM, "US Soccer—Nike Soccer," http://www.myspace.com/nikesoccer, printed Mar. 2, 2006, pp. 1-14.

* cited by examiner

Soccer

Basketball

METHOD, SYSTEM, AND GRAPHICAL USER INTERFACE FOR PERSONALIZED ONLINE SPORTS TEAM CHARTS

RELATED APPLICATIONS

This application claims priority to U.S. Provisional Patent Application No. 60/780,328, filed Mar. 7, 2006, entitled "Method, System, and Graphical User Interface for Personalized Online Sports Team Charts," which application is incorporated by reference herein in its entirety.

This application is related to patent application Ser. No. 60/780,329, "System and Method for Location-Based Community Search in an Online Social Network," filed Mar. 7, 2006, which application is incorporated by reference herein in its entirety.

TECHNICAL FIELD

The disclosed embodiments relate generally to online communications. More particularly, the disclosed embodiments relate to methods, systems, and graphical user interfaces for creating and communicating personalized online sports team charts.

BACKGROUND

People increasingly use online communications to interact with their friends and to meet new people. Numerous techniques have been developed that use online communications to improve our social lives, including social networking techniques.

One popular topic for online communications is sports. Online users like to discuss and compare their favorite players and teams. These communications may concern sports teams at all levels, from local neighborhood pickup teams, to high school, college, or professional teams, and even to a user's own "fantasy" teams, which may mix players from different teams and levels. However, the techniques developed to date make it difficult for users to keep track of their favorite players and to discuss and compare their favorites with other online users.

Thus, it would be highly desirable to find new, more intuitive and efficient ways for online users to communicate about sports.

SUMMARY

The present invention overcomes the limitations and disadvantages described above by providing methods, systems, and graphical user interfaces (GUIs) for creating and communicating personalized online sports team charts.

One aspect of the invention involves a graphical user interface on a computer that includes a graphic of an athletic playing field or a portion thereof, and a plurality of player positions on the athletic field. At least some of the player positions contain thumbnail images selected by a first user. The thumbnail images provide links to corresponding profiles in an online social network.

Another aspect of the invention involves a computer-implemented method in which a server computer sends information corresponding to a graphic of an athletic playing field or a portion thereof, and sends information corresponding to a plurality of player positions on the athletic playing field. When this information is displayed, at least some of the player positions contain thumbnail images selected by a first user. In response to selection of one of the thumbnail images by a second user at a client computer, the server computer sends information to the client computer that corresponds to a page in an online social network associated with the selected thumbnail image.

Another aspect of the invention involves a computer-implemented method in which a client computer displays a graphic of an athletic playing field or a portion thereof; displays a plurality of player positions on the athletic playing field; and in response to selection of one or more thumbnail images by a user at the client computer, displays the one or more thumbnail images in the plurality of player positions on the athletic playing field. The thumbnail images provide links to corresponding profiles in an online social network.

Another aspect of the invention involves a computer-implemented method in which a client computer displays a graphic of an athletic playing field or a portion thereof, and displays a plurality of player positions on the athletic playing field. At least some of the player positions contain thumbnail images selected by a first user. In response to selection of one of the thumbnail images by a second user at the client computer, the client computer displays a page in an online social network that corresponds to the selected thumbnail image.

Another aspect of the invention involves a system that includes at least one server. The at least one server is configured to send information corresponding to a graphic of an athletic playing field or a portion thereof; send information corresponding to a plurality of player positions on the athletic playing field, wherein at least some of the player positions contain thumbnail images selected by a first user; and in response to selection of one of the thumbnail images by a second user at a client computer, send information to the client computer that corresponds to a page in an online social network associated with the selected thumbnail image.

Another aspect of the invention involves a client computer that is configured to display a graphic of an athletic playing field or a portion thereof; display a plurality of player positions on the athletic playing field; and in response to selection of one or more thumbnail images by a user at the client computer, display the one or more thumbnail images in the plurality of player positions on the athletic playing field. The thumbnail images provide links to corresponding profiles in an online social network.

Another aspect of the invention involves a client computer that is configured to display a graphic of an athletic playing field or a portion thereof; display a plurality of player positions on the athletic playing field, wherein at least some of the player positions contain thumbnail images selected by a first user; and in response to selection of one of the thumbnail images by a second user at the client computer, display a page in an online social network that corresponds to the selected thumbnail image.

Another aspect of the invention involves a computer-program product that includes a computer readable storage medium and a computer program mechanism embedded in the computer readable storage medium. The computer program mechanism includes instructions, which when executed by a server computer, cause the server computer to send information corresponding to a graphic of an athletic playing field or a portion thereof; send information corresponding to a plurality of player positions on the athletic playing field, wherein at least some of the player positions contain thumbnail images selected by a first user; and in response to selection of one of the thumbnail images by a second user at a client computer, send information to the client computer that corresponds to a page in an online social network associated with the selected thumbnail image.

Another aspect of the invention involves a computer-program product that includes a computer readable storage medium and a computer program mechanism embedded in the computer readable storage medium. The computer program mechanism includes instructions, which when executed by a client computer, cause the client computer to display a graphic of an athletic playing field or a portion thereof; display a plurality of player positions on the athletic playing field; and in response to selection of one or more thumbnail images by a user at the client computer, display the one or more thumbnail images in the plurality of player positions on the athletic playing field, wherein the thumbnail images provide links to corresponding profiles in an online social network.

Another aspect of the invention involves a computer-program product that includes a computer readable storage medium and a computer program mechanism embedded in the computer readable storage medium. The computer program mechanism includes instructions, which when executed by a client computer, cause the client computer to display a graphic of an athletic playing field or a portion thereof; display a plurality of player positions on the athletic playing field, wherein at least some of the player positions contain thumbnail images selected by a first user; and in response to selection of one of the thumbnail images by a second user at the client computer, display a page in an online social network that corresponds to the selected thumbnail image.

Another aspect of the invention involves a server computer that includes means for sending information corresponding to a graphic of an athletic playing field or a portion thereof; means for sending information corresponding to a plurality of player positions on the athletic playing field, wherein at least some of the player positions contain thumbnail images selected by a first user; and in response to selection of one of the thumbnail images by a second user at a client computer, means for sending information to the client computer that corresponds to a page in an online social network associated with the selected thumbnail image.

Another aspect of the invention involves a client computer that includes means for displaying a graphic of an athletic playing field or a portion thereof; means for displaying a plurality of player positions on the athletic playing field; and in response to selection of one more thumbnail images by a user at the client computer, means for displaying the one or more thumbnail images in the plurality of player positions on the athletic playing field, wherein the thumbnail images provide links to corresponding profiles in an online social network.

Another aspect of the invention involves a client computer that includes means for displaying a graphic of an athletic playing field or a portion thereof; means for displaying a plurality of player positions on the athletic playing field, wherein at least some of the player positions contain thumbnail images selected by a first user; and in response to selection of one of the thumbnail images by a second user at the client computer, means for displaying a page in an online social network that corresponds to the selected thumbnail image.

Thus, personalized online sports team charts provide new, more intuitive and efficient ways for online users to communicate about sports.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, and graphical user interfaces for personalized online sports charts are described. These charts allow users in online social networks to build their own fantasy teams, specifying the players they would field and what positions the players would play. In some embodiments, these charts appear in user profiles, so that other users can view the charts.

Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
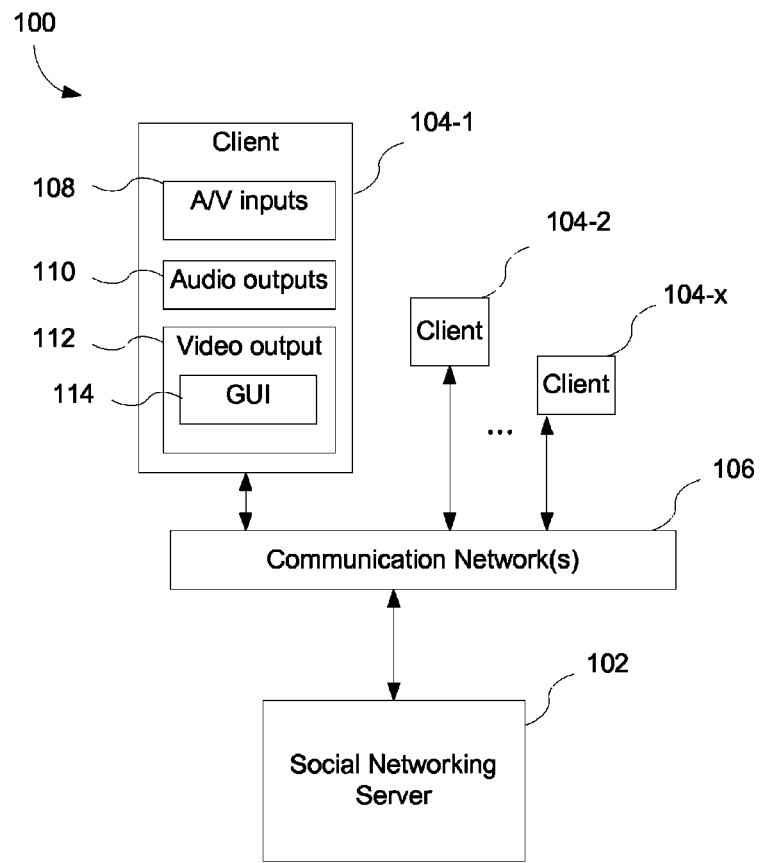
FIG. 1 is a block diagram illustrating an exemplary distributed computer system in accordance with one embodiment of the invention.

FIG. 1 is a block diagram illustrating an exemplary distributed computer system 100 according to one embodiment of the invention. FIG. 1 shows various functional components that will be referred to in the detailed discussion that follows. This system includes client computers 104, social networking server 102, and communication network(s) 106 for interconnecting these components.

Client computer 104 can be any of a number of computing devices (e.g., an internet kiosk, personal digital assistant, cell phone, gaming device, desktop computer, or laptop computer) used to enable the activities described below. Client 104 may include audio and/or video inputs 108 (e.g., a microphone and a video camera), audio output 110 (e.g., speakers or headphones), and video output 112 (e.g., a display). Video output 112 displays a graphical user interface (GUI) 114.

Figure 2:
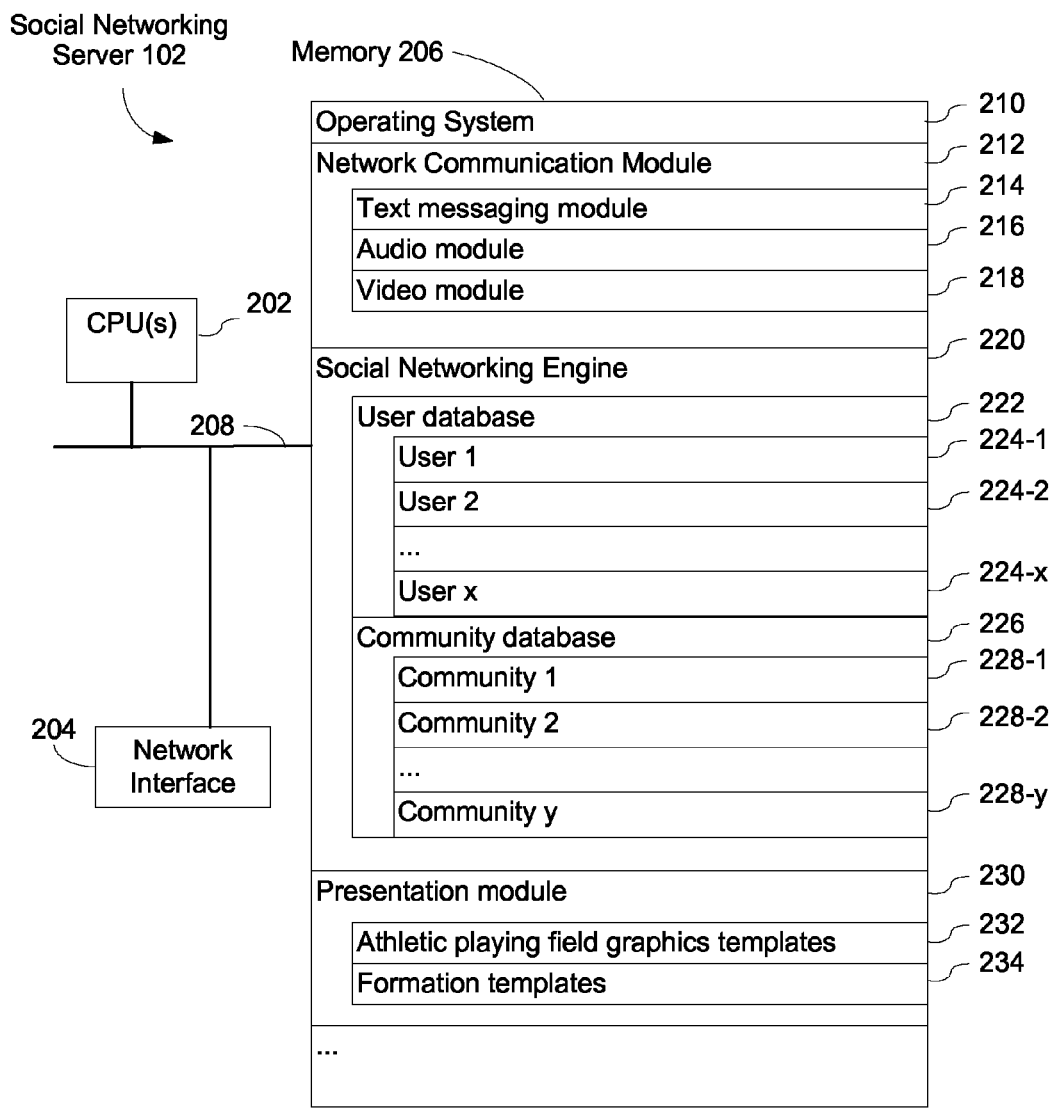
FIG. 2 is a block diagram illustrating a social networking server in accordance with one embodiment of the present invention.

FIG. 2 is a block diagram illustrating social networking server 102 in accordance with one embodiment of the present invention. Server 102 typically includes one or more processing units (CPUs) 202, one or more network or other communications interfaces 204, memory 206, and one or more communication buses 208 for interconnecting these components. The communication buses 208 may include circuitry (sometimes called a chipset) that interconnects and controls communications between system components. Server 102 may optionally include a graphical user interface (not shown), which typically includes a display device, a keyboard, and a mouse or other pointing device. Memory 206 may include high-speed random access memory and may also include non-volatile memory, such as one or more magnetic or optical storage disks. Memory 206 may optionally include mass storage that is remotely located from CPUs 202. Memory 206 may store the following programs, modules and data structures, or a subset or superset thereof:

- Operating System 210 that includes procedures for handling various basic system services and for performing hardware dependent tasks;
- Network Communication Module (or instructions) 212 that is used for connecting server 102 to other computers (e.g., clients 104) via the one or more communications Network Interfaces 204 (wired or wireless) and one or more communications networks 106 (FIG. 1), such as the Internet, other wide area networks, local area networks, metropolitan area networks, and so on;
- Social Networking Engine 220 that receives social-networking-related requests from and provides responses to clients 104; and
- Presentation module 230 that formats the results from social networking engine 220 for display.

Network Communication Module 212 may include the following programs, modules and data structures, or a subset or superset thereof:

- Text messaging module 214 that coordinates text messaging (e.g., instant messaging) between clients 104;
- Audio module 216 that coordinates audio communications (e.g., voice chat or VoIP) between clients 104; and
- Video module 218 that coordinates video communications (e.g., video chat) between clients 104.

In some embodiments, the text messaging, audio or voice communications, and/or video communications between clients 104 are performed in a manner that does not require the use of server 102, such as via peer-to-peer networking.

Social Networking Engine 220 may include the following programs, modules and data structures, or a subset or superset thereof:

- User database 222 that stores records 224 for users (e.g., records 224-1, 224-2, 224-x for Users 1, 2 and x, respectively); and
- Community database 226 that stores records 228 for communities in the social network (e.g., records 228-1, 228-2, 228-y for Communities 1, 2 and y, respectively).

Presentation module 230 may include the following programs, modules and data structures, or a subset or superset thereof:

- Athletic field graphics templates 232 that include graphical representations of various athletic fields (e.g., a soccer field, a baseball field, a football field, a basketball court, and/or a hockey rink); and
- Formation templates 234 that include predefined player position information for the various athletic field templates (e.g., player positions in the 4-4-2, 4-3-3, 4-2-4, 3-5-2, and 3-6-1 formations in soccer, player positions in the 3-4-4 and 4-3-4 defensive formations in football, etc.).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows server 102 as a number of discrete items, FIG. 2 is intended more as a functional description of the various features which may be present in server 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in server 102 and how features are allocated among them will vary from one implementation to another, and may depend in part on the amount of data traffic that the system must handle during peak usage periods as well as during average usage periods.

Figure 3A:
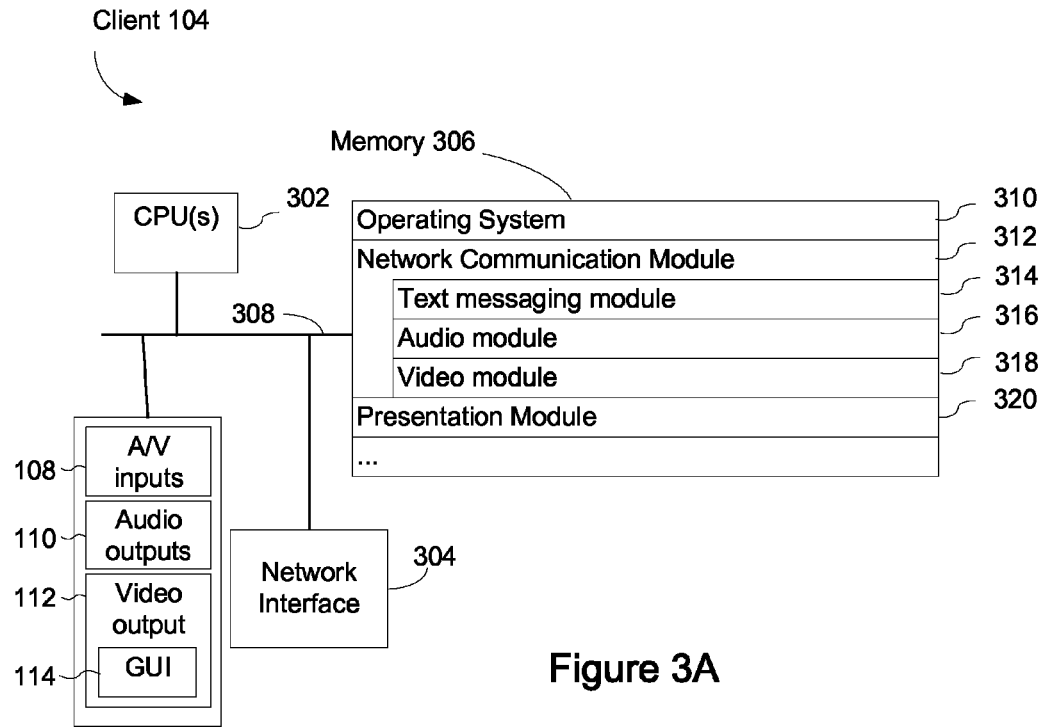
FIGS. 3A and 3B are block diagrams illustrating two exemplary clients.
Figure 3B:
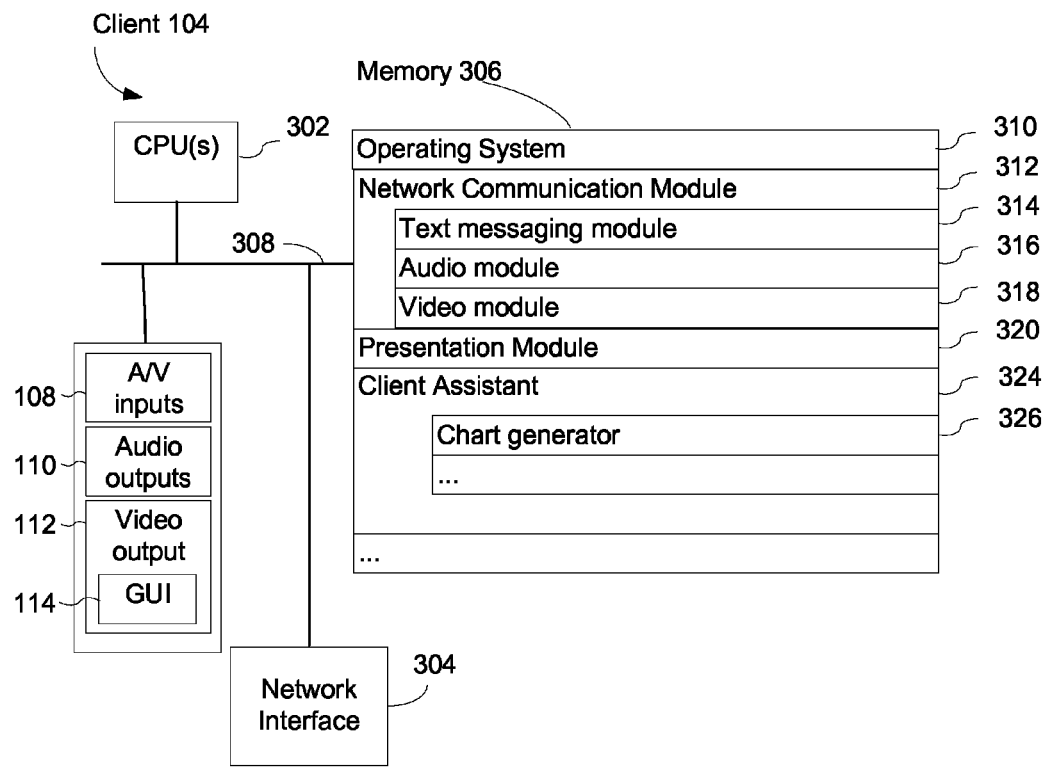

FIGS. 3A and 3B are block diagrams illustrating two exemplary clients 104. As noted above, client 104 may include audio/video inputs 108 (e.g., a microphone and a video camera), audio output 110 (e.g., speakers or headphones), and video output 112 (e.g., a display). Video output 112 displays graphical user interface (GUI) 114. Client 104 typically includes one or more processing units (CPUs) 302, one or more network or other communications interfaces 304, memory 306, and one or more communication buses 308 for interconnecting these components. Memory 306 may include high-speed random access memory and may also include non-volatile memory, such as one or more magnetic or optical storage disks. Memory 306 may store the following programs, modules and data structures, or a subset or superset thereof:

- Operating System 310 that includes procedures for handling various basic system services and for performing hardware dependent tasks;
- Network Communication Module (or instructions) 312 that is used for connecting client 104 to other computers (e.g., server 102 and other clients 104) via the one or more communications Network Interfaces 304 (wired or wireless) and one or more communication networks 106 (FIG. 1), such as the Internet, other wide area networks, local area networks, metropolitan area networks, and so on;

Presentation Module 320 (e.g., a browser application), for formatting the personalized sports charts, and other data (e.g., pictures, lists, tables, and other text, icons and graphics) for display in GUI 114; and Client Assistant 324, which handles data formatting and/or management tasks, at least some of which could also be handled by Social Networking Engine 220.

Network Communication Module 312 may include the following programs, modules and data structures, or a subset or superset thereof:

Text messaging module 314 that supports text messaging (e.g., instant messaging) between clients 104;

Audio module 316 that supports audio communications (e.g., voice chat or VoIP) between clients 104; and Video module 318 that supports video communications (e.g., video chat) between clients 104.

As illustrated schematically in FIG. 3B, client 104 can incorporate modules, applications, and instructions for performing a variety of social networking related processing tasks (e.g., chart generator 326), at least some of which could be handled by Social Networking Engine 220 in server 102 instead. Alternatively, in some embodiments, client 104 can contain less functionality than shown in FIG. 3A. For example, in some embodiments, client 104 need not have audio module 316.

Figure 4:
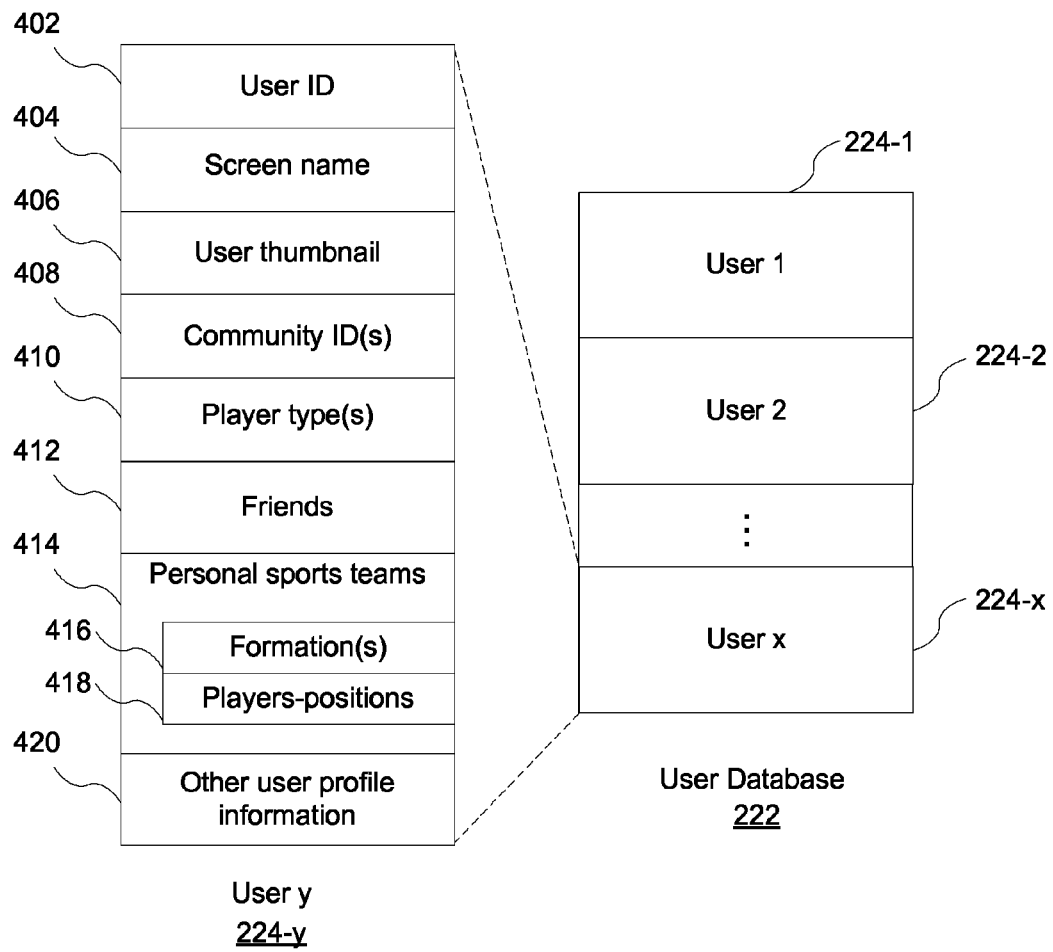
FIG. 4 is a block diagram illustrating an exemplary user database and an exemplary record for a particular user in accordance with one embodiment of the invention.

FIG. 4 is a block diagram illustrating an exemplary user database 222 and an exemplary record 224-$x$ for a particular user in accordance with one embodiment of the invention. User Database 222 stores user records 224, for example User 1 (224-1) through User x (224-$x$), where x may represent the number of users.

A user record 224 (e.g., record 224-$x$ for User x) may include the following data, or a subset or superset thereof:

User ID 402 that uniquely identifies a particular user (e.g., an n-bit binary number);

Screen name 404 for the user;

User thumbnail 406 that represents the user (e.g., a small digital image or graphic of the user and/or chosen by the user) in GUI 114;

Community ID(s) 408 (e.g., n-bit binary numbers) that uniquely identify particular communities in the social network that the user belongs to (e.g., "Beckham" or some other well-known athlete, "San Francisco," "Team A," "Cubberly Soccer Field," etc.);

Player type(s) 410 that identify the type of player that the user is in particular sports (e.g., a professional soccer player, a self-labeled amateur football player, etc.) and/or the position of the user in particular sports (e.g., a forward, mid-fielder, defender, or goal keeper in soccer; a quarterback, running back, receiver, offensive lineman, defensive lineman, linebacker, or defensive back in football; etc.);

Friends 412 that contains user IDs or other unique identifiers of friends of the user in the online social network, who are typically chosen by the user;

Personal sports team(s) 414 that are chosen by the user, which may include:

Formation information 416 for the particular sport (e.g., a pointer to a particular formation template 234) that is used to place user-selected thumbnails on a corresponding athletic field graphic (e.g., athletic field template 232) in a GUI; and Player and position information 418 (e.g., user IDs corresponding to people or communities selected by the user and the corresponding positions in formation template 234 for those people/communities selected by the user); and Other profile information 420 for the user (e.g., contact information for the user, still and/or video images uploaded by the user or pointers/links thereto, etc.).

Figure 5:
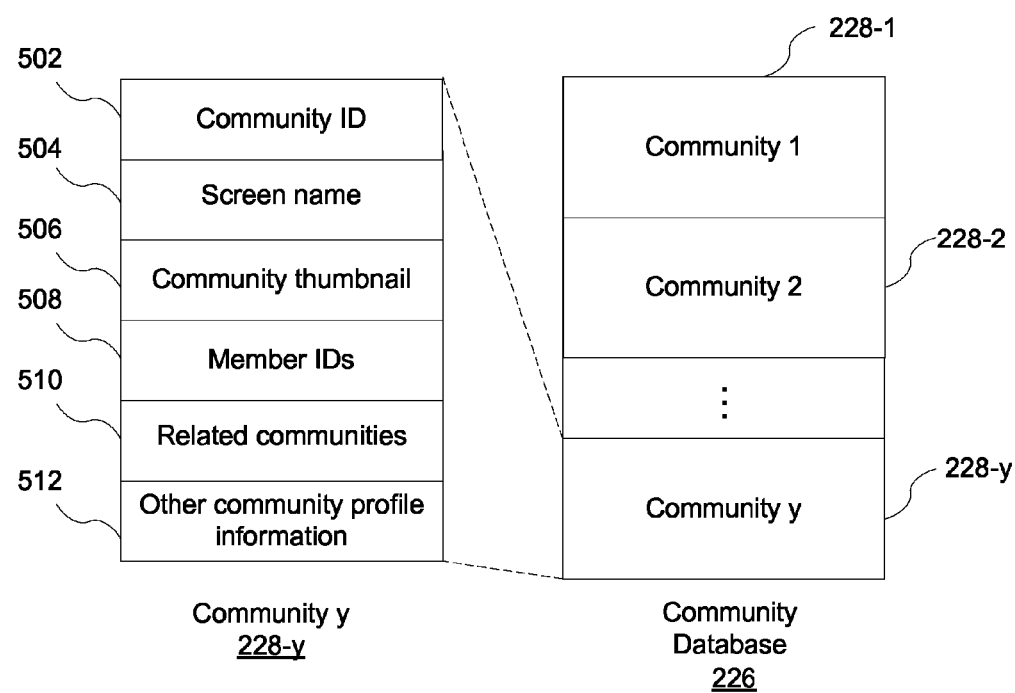
FIG. 5 is a block diagram illustrating an exemplary community database and an exemplary record for a particular community in accordance with one embodiment of the invention.

FIG. 5 is a block diagram illustrating an exemplary community database 226 and an exemplary record 228-$y$ for a particular community in accordance with one embodiment of the invention. Community Database 226 stores community records 228, for example Community 1 (228-1) through Community y (228-$y$), where y may represent the number of communities. Communities are typically created and maintained by one or more users of the social network that share a common interest (e.g., a particular player, a particular sport, a particular team, or a particular location or playing field for a sport).

A community record 228 (e.g., record 228-$y$ for Community y) may include the following data, or a subset or superset thereof:

Community ID 502 that uniquely identifies a particular community (e.g., an n-bit binary number);

Screen name 504 for the community;

Community thumbnail 506 that represents the community (e.g., a small digital image or graphic) in GUI 114;

Member IDs 508 (e.g., a plurality of user IDs 402) that uniquely identify particular users in the social network that belong to the community;

Related communities 510 that contains community IDs or other unique identifiers of related communities in the social network; and Other profile information 512 for the community (e.g., contact information for the person(s) who maintain the community, a geocode and/or address corresponding to the community, still and/or video images uploaded by users in the community or pointers/links thereto, a listing of events related to the community, etc.).

In some cases, some communities are "athlete" communities that are similar to fan clubs, with each athlete community associated with a particular athlete (e.g., a professional athlete or other well-known athlete). For these communities, the screen name 504 is typically the name of the athlete and the community thumbnail 506 is a picture of the athlete or other image associated with the athlete. Further, some athlete communities may be officially sponsored communities, while other athlete communities are created by fans of the athletes. Officially sponsored athlete communities may be distinguished by a banner in the community thumbnail 506 and may also be indicated by a flag or the like in the community record 228 (e.g., in the "other profile information" 512). Similarly, other particular types of communities (e.g., unofficial communities for a particular athlete, communities for a particular location or playing field for a sport, and communities for a particular city) may each be indicated by a different flag in the community record (e.g., in the "other profile information" 512).

Figure 6A:
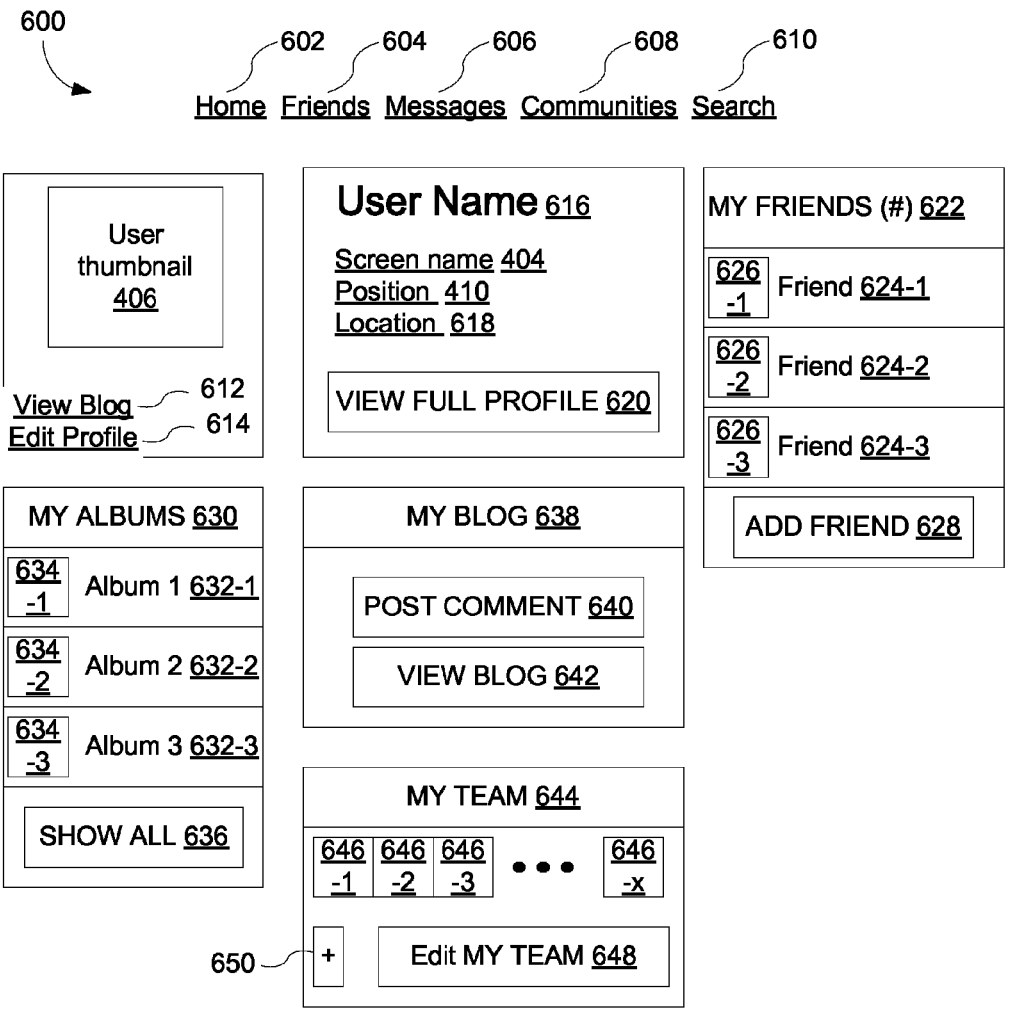
FIGS. 6A and 6B are schematic screen shots of an exemplary graphical user interface of a user's profile page, as seen by the user, in an online social network in accordance with one embodiment of the present invention.
Figure 6B:
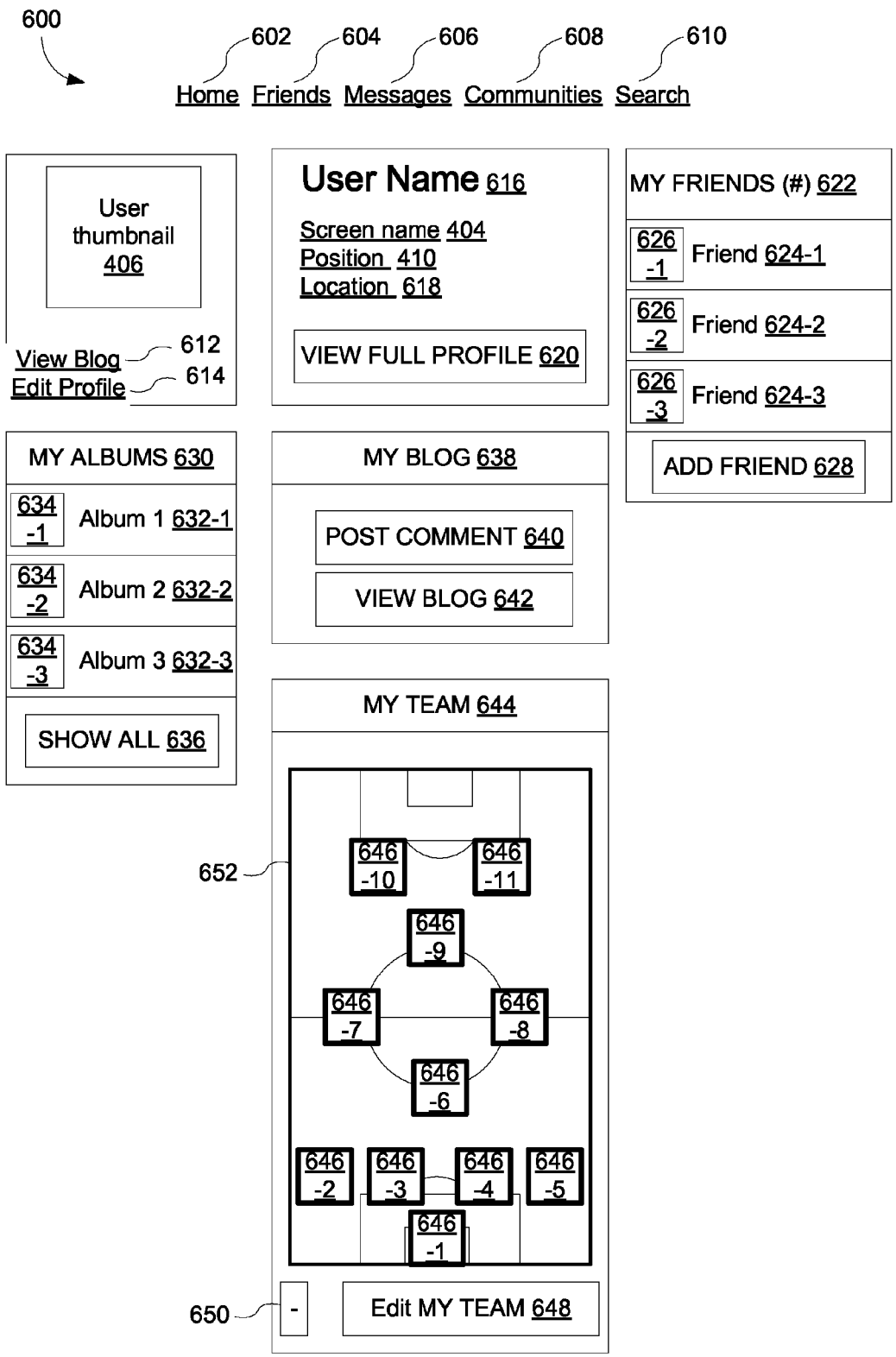

FIGS. 6A and 6B are schematic screen shots of an exemplary graphical user interface of a user's profile page 600, as seen by the user, in an online social network in accordance with one embodiment of the present invention. In some embodiments, GUI 600 contains a subset or a superset of the elements depicted in FIG. 6. In some embodiments, the user's page GUI 600 is displayed by client 104 in response to the user logging in to the social network server 102. In some embodiments, the user's page GUI 600 is displayed by client 104 in response to the user selecting a link to his profile on his home page in the online social network. In some embodiments, the user's profile page 600 contains the following elements, or a subset or superset thereof:

"Home" link 602 that links the user to the user's home page in the social network;

"Friends" link 604 that links the user to a page where the user can view, create, delete, search, and otherwise manage his or her friends 412 in the social network;

"Messages" link 606 that links the user to a page where the user can view, compose, send, search and otherwise manage his or her messages;

"Communities" link 608 that links the user to a page where the user can view, create, search, and otherwise interact with communities in the social network;

"Search" link 610 that links the user to a page where the user can perform searches in the social network;

User thumbnail 406, as described above;

"View Blog" link 612 that links the user to a page with the user's blog;

"Edit Profile" link 614 that links the user to a page where the user can edit the information in his or her profile (e.g., edit information in the user's record 224);

User name 616;

Screen name 404 or other nick name;

Position 410, as described above;

Location 618 that gives some indication of the geographic location of the user (e.g., city and state information 420, which may be provided in user record 224);

"View full profile" link 620 that provides additional information from the user's record 224 when selected;

"My friends" area 622 that lists the user's friends 624 in the social network (e.g., based on the user IDs listed in the friends 412 section of the user's record 224) or a subset thereof, in some cases with thumbnail images 626 determined from the friends' user records 224;

"Add friend" link 628 that links the user to a page where the user can view, create, delete, search, and otherwise manage his or her friends 412 in the social network;

"My albums" area 630 that lists the user's albums 632 in the social network (e.g., based on information 420 in the user's record 224) or a subset thereof, in some cases with thumbnail images 634 from the corresponding albums 632;

"Show all" link 636 that links the user to a page where the user can view, create, edit, and otherwise manage his or her albums 632 in the social network;

"My blog" area 638 that includes:
   "Post comment" icon 640 that links the user to a page with the user's blog for posting new content in the blog; and
   "View blog" icon 642 that links the user to a page with the user's blog for viewing content in the blog; and "My team" area 644 that may include:
   Thumbnail images 646 that correspond to players selected by the user for the user's personal team (e.g., the user's personal dream team or favorites team);
   "Edit my team" icon 648 that links the user to a page (e.g., edit GUI 700) where the user can edit the players and/or the player positions in the user's personal team;
   Toggle icon 650 that lets the user toggle between a collapsed view of his or her team 644 (FIG. 6A) and an expanded view of his or her team 644 (FIG. 6B); and
   Athletic playing field graphic 652 that has thumbnails 646 of players selected by the user for the user's personal team superimposed on one or more player positions (e.g., player positions 726-x in edit GUI 700, FIG. 7) that may also be selected by the user for the user's personal team.

Note that multiple "My Team" areas 644 may be displayed in GUI 600, corresponding to multiple personal sports teams chosen by the user for different sports, even though only one "My Team" area 644 is shown in FIGS. 6A and 6B.

Figure 7:
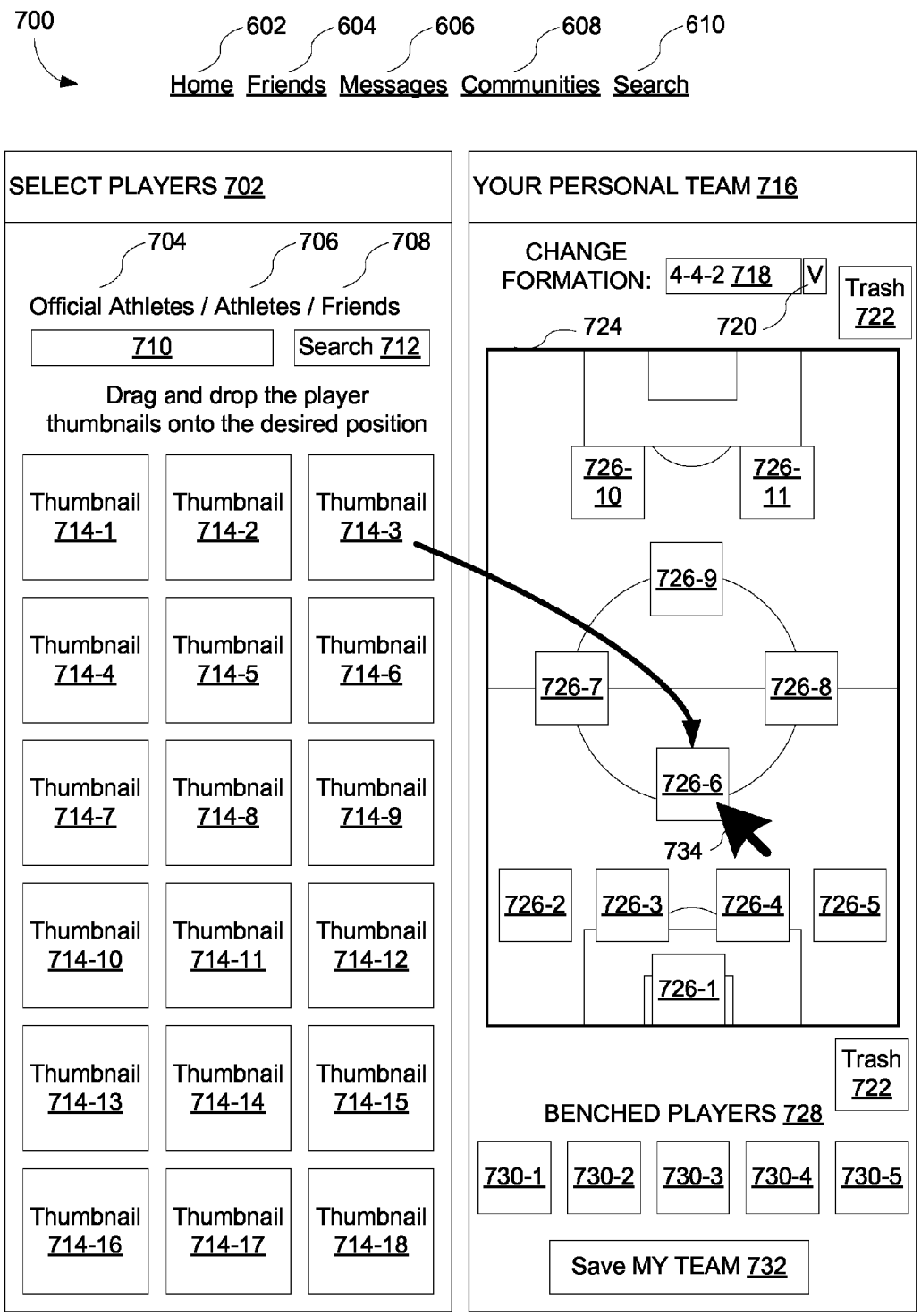
FIG. 7 is a schematic screen shot of an exemplary graphical user interface for creating and/or editing one of the user's personal sports teams in accordance with one embodiment of the present invention.

FIG. 7 is a schematic screen shot of an exemplary graphical user interface for creating and/or editing one of the user's personal sports teams in accordance with one embodiment of the present invention. In some embodiments, GUI 700 contains a subset or a superset of the elements depicted in FIG. 7. In some embodiments, the user's editing page GUI 700 is displayed by client 104 in response to receiving a user request to create or edit one of the user's personal sports teams (e.g. by the user activating the "edit my team" icon 648 in GUI 600). In some embodiments, the user's editing page 700 contains the following elements, or a subset or superset thereof:

"Home" link 602, as described above;

"Friends" link 604, as described above;

"Messages" link 606, as described above;

"Communities" link 608, as described above;

"Search" link 610, as described above;

"Select players" area 702 that may include:
   "Official Athletes" filter 704 that displays thumbnails 714 that correspond to the thumbnails 506 in records 228 (or a subset thereof) with a flag that designates the community record 228 as an "officially sponsored community for an athlete" or the like;
   "Athletes" filter 706 that displays thumbnails 714 that correspond to the thumbnails 506 in records 228 (or a subset thereof) with a flag that designates the community record 228 as an "unsponsored community for an athlete" or the like;
   "Friends" filter 704 that displays thumbnails 714 that correspond to the thumbnails 406 in records 224 (or a subset thereof) of friends 412 of the user (e.g., just for fun, a user can put his friends on his personal team 716 even if the friends are not athletes or do not play the sport);
   Search text input box 710; and
   Search initiation icon 712 to initiate a search of records 224 in user database 222 that contain the search terms entered in box 710; and "Your personal team" area 716 that may include:
   A plurality of predefined formations (e.g., the 4-4-2 formation 718 for soccer, which may correspond to a formation template 234 received by client 104 from server 102), which may be chosen from a menu 720;
   An athletic playing field graphic 724 (e.g., which may correspond to an athletic playing field graphics template 232 received by client 104 from server 102) that corresponds to the sport for which the user is selecting his or her personal team;
   A plurality of player positions 726 for the sport for which the user is selecting his or her personal team, at least some of which "contain" (i.e., are assigned or associated with) thumbnail images 714 selected by the user (e.g., by dragging and dropping the image 714 into the position 726);
   Trash can icons 722 for deleting thumbnails of players that the user no longer wants on his or her personal team (e.g., by dragging and dropping an image 714 occupying one of the positions 726 into the trash 722);
   Benched players area 728 that has bench positions 730 that can hold thumbnail images 714 of players that the user has not selected for his "starting" personal team; and "Save my team" icon 732 that initiates storage of changes made by the user to his or her personal team (e.g., by client 104 sending new/updated information on the players-positions 418 and/or formations 416 to server 102 for storage in the user's record 224 in database 222).

In some embodiments, hovering over a thumbnail 714 brings up a floating box containing a larger picture, the player's name, and some related profile information, such as the player's team and position, if available.

In some embodiments, clicking and dragging on a thumbnail 714 will cause a smaller version on the thumbnail 714 to follow the cursor 734. In some embodiments, if the cursor 734 is released on or near a position 726 on the field 724, the corresponding player's image 714 and name will appear on the position. In some embodiments, the border of a position 726 is highlighted to indicate that the selected thumbnail 714 will fill the position 726. In some embodiments, users can move thumbnails 714 between positions 726 and drag the thumbnails off the field completely to remove them from the team. In some embodiments, if a user has placed thumbnails 714 in certain positions 726 in a given formation 718 and then the user changes the formation, those thumbnails 714 will shift to the most similar position 726 in the new formation 718.

Figure 8:
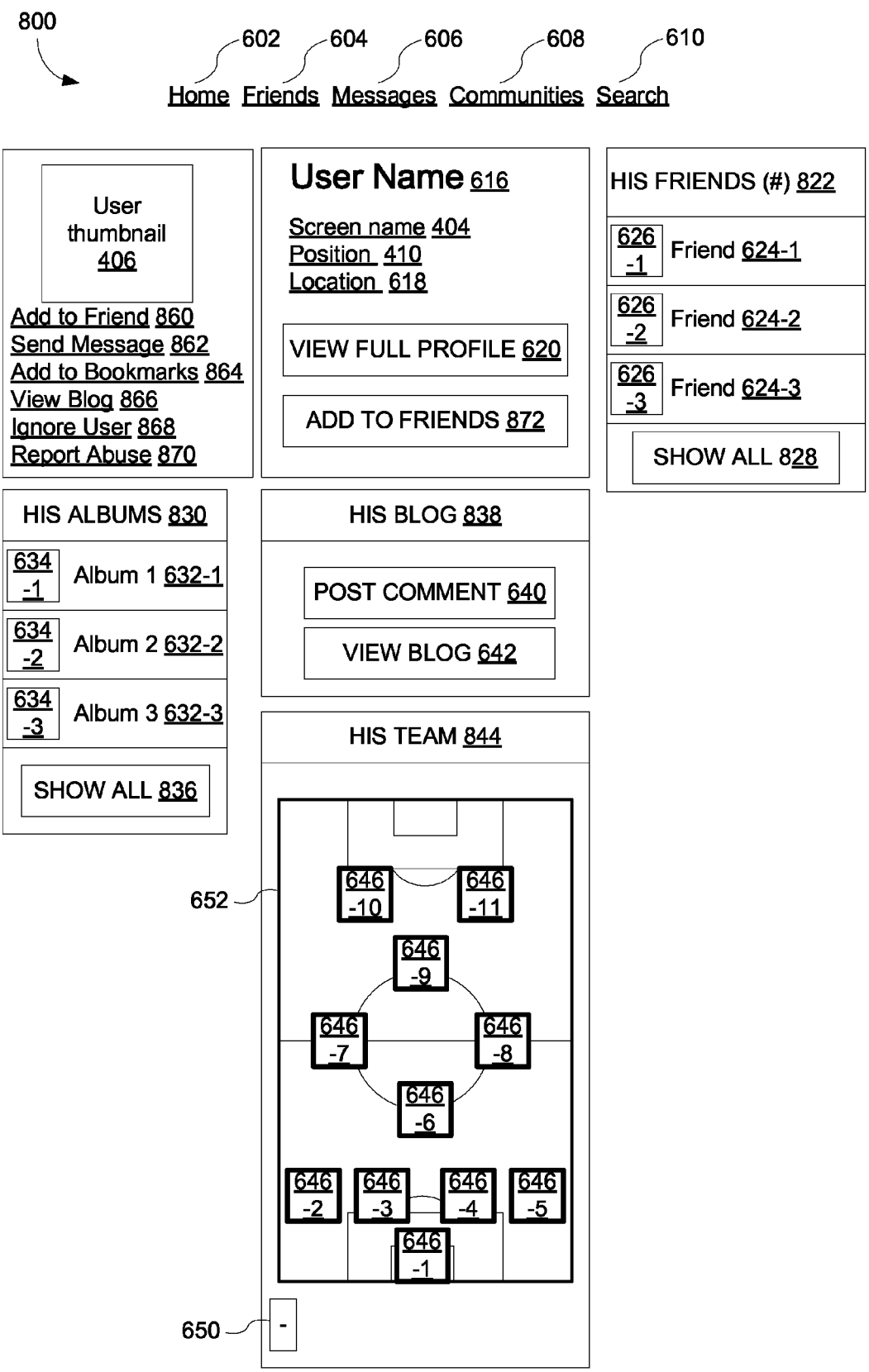
FIG. 8 is a schematic screen shot of an exemplary graphical user interface of a first user's profile page, as seen by a second user, in an online social network in accordance with one embodiment of the present invention.

FIG. 8 is a schematic screen shot of an exemplary graphical user interface of a first user's profile page 800, as seen by a second user, in an online social network in accordance with one embodiment of the present invention. In some embodiments, GUI 800 contains a subset or a superset of the elements depicted in FIG. 8. In some embodiments, GUI 800 is displayed by client 104 in response to the second user selecting a thumbnail image corresponding to the first user in the online social network. In some embodiments, the first user's profile page 800, as seen by the second user, contains the following elements, or a subset or superset thereof:

"Home" link 602, as described above;
"Friends" link 604, as described above;
"Messages" link 606, as described above;
"Communities" link 608, as described above;
"Search" link 610, as described above;
User thumbnail 406 for the first user, as described above;
"Add to Friend" link 860 that links the second user to a page that adds the first user to the second user's list of friends in the online social network;
"Send Message" link 862 that links the second user to a page for sending a message to the first user;
"Add to Bookmarks" link 864 that bookmarks the first user's page;
"View Blog" link 866 that links the second user to a page with the first user's blog;
"Ignore User" link 868 stops communications (e.g., messages) from the first user to the second user;
"Report Abuse" link 870 that reports the first user to the overseer of the online social network;
User name 616 for the first user, as described above;
Screen name 404 or other nick name for the first user;
Position 410 for the first user, as described above;
Location 618 for the first user, as described above;
"View full profile" link 620 for the first user, as described above;
"Add to Friends" link 872 that links the second user to a page that adds the first user to the second user's list of friends in the online social network;
"His friends" area 822 that lists the first user's friends 624 in the social network, as described above for "My friends" area 622;
"Show All" link 828 that links the second user to a page where all of the first user's friends in the social network are shown;
"His albums" area 830 that lists the first user's albums 632, as described above for "My albums" area 630;
"Show all" link 836 that links the second user to a page where all of the first user's albums 632 are shown;
"His blog" area 838 that links the second user to a page where the first user's blog is shown, as described above for "My blog" area 638; and
"His team" area 844, which lets the second user view the personal sports team(s) created by the first user in the first user's "My Team" area 644, as described above.

Figure 9A:
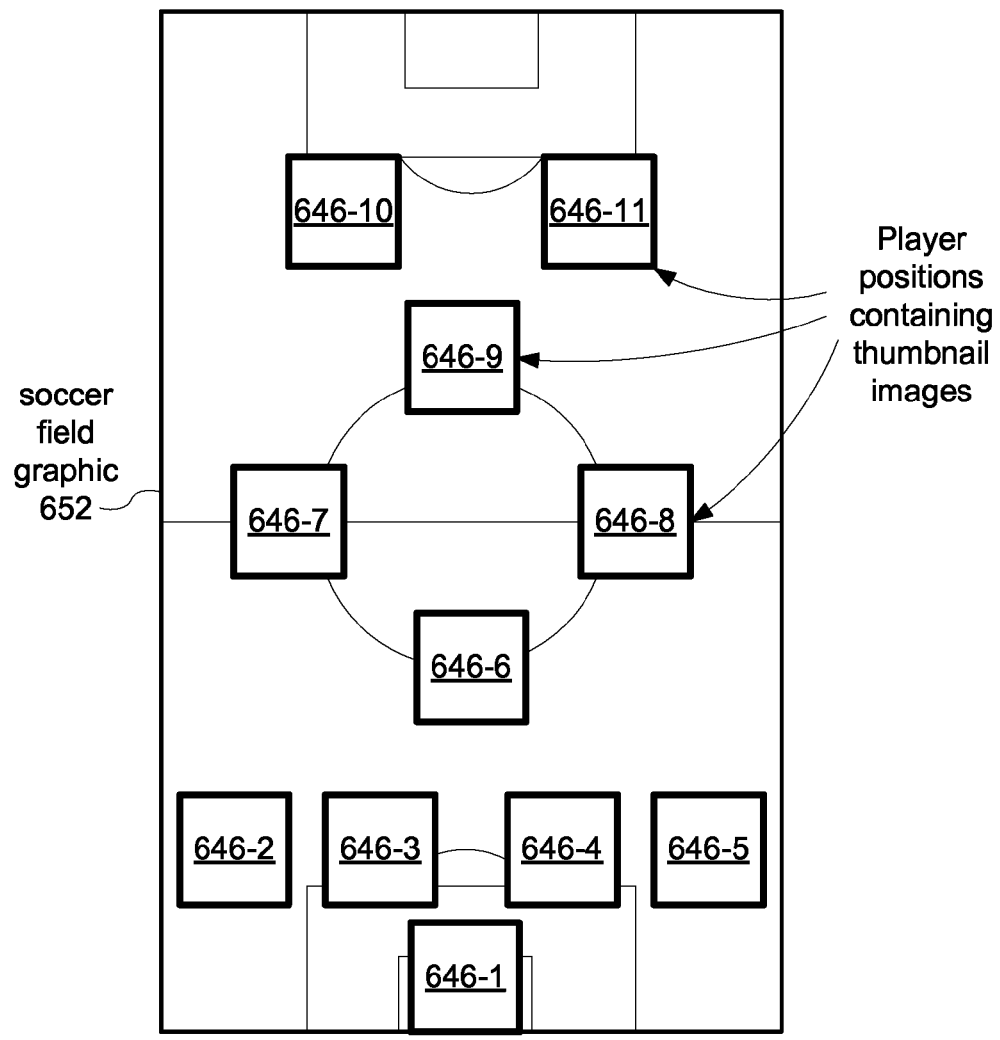
FIGS. 9A and 9B are exemplary graphical user interfaces of personalized online sports charts in accordance with embodiments of the present invention.
Figure 9B:
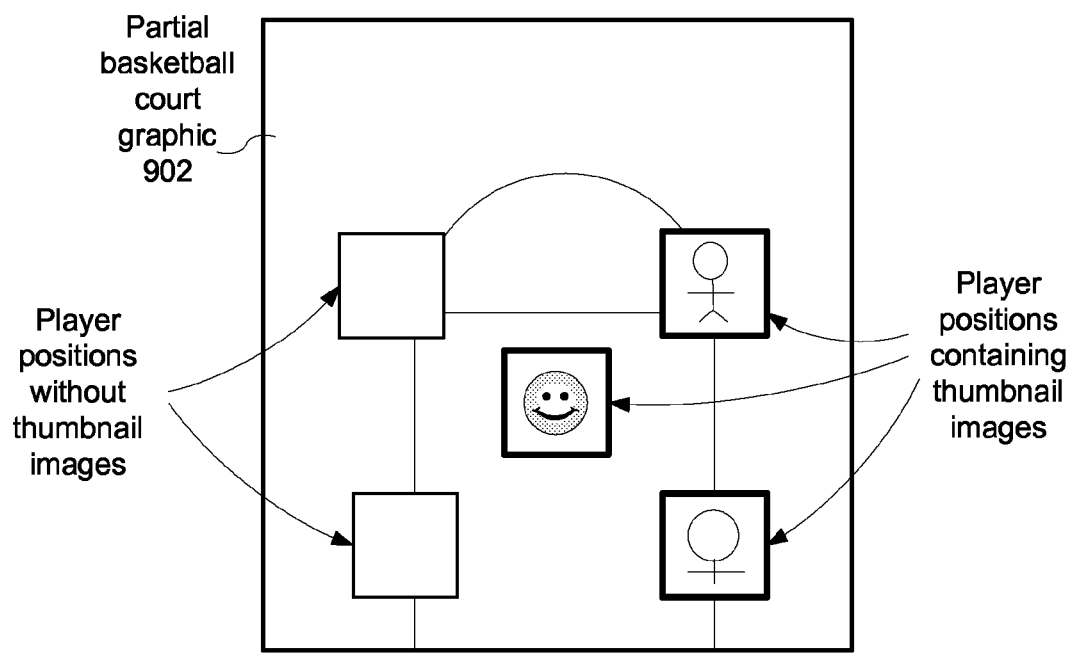

FIGS. 9A-9B are exemplary graphical user interfaces of personalized online sports charts in accordance with embodiments of the present invention.

The GUIs include a graphic of an athletic playing field or a portion thereof. In some embodiments, the athletic playing field is a soccer field, a baseball field, a football field, a basketball court, or a hockey rink.

The GUIs also include a plurality of player positions (e.g., player positions occupied by thumbnail images 646-$x$ in FIG. 9) on the athletic field. At least some of the player positions contain thumbnail images selected by a first user. In some embodiments, the locations of the plurality of player positions on the athletic field can be modified by the first user. The thumbnail images 646-$x$ provide links to corresponding profiles in an online social network. In some embodiments, the profiles are of friends of the first user, users in the social network identified as players, etc.

In some embodiments, the thumbnail images include thumbnail images of individuals. In some embodiments, the thumbnail images include images selected from the group consisting of images of individuals, team logos, and graphic art images. In some embodiments, the graphic art images are each associated with a person, group (e.g., a class of people in the social network) or a community in the social network.

In some embodiments, the athletic playing field graphic and the plurality of player positions containing thumbnail images selected by a first user are viewable by a second user who accesses a page corresponding to the first user (e.g., GUI 800).

In some embodiments, the GUI also includes a bench area (e.g., area 728 in GUI 700) adjacent to the playing field 724 that contains a plurality of bench positions 730. In some embodiments, the bench area 728 is shown to a first user when the first user is editing his or her personal sports team, but the bench area 728 is not visible to other users when the other users view the first user's profile. The bench area 728 provides a convenient location for the first user to put particular player thumbnails so that the first user does not have to search for those particular player thumbnails.

In some embodiments, the GUI also includes a region (e.g., area 702 in GUI 700), apart from the athletic playing field graphic 724, that contains a plurality of thumbnail images 714 that may be selected by the first user for inclusion in the plurality of the player positions 726 on the athletic field 724. In some embodiments, the thumbnail images 714 are selected by dragging and dropping the images onto the player positions 726.

Figure 10:
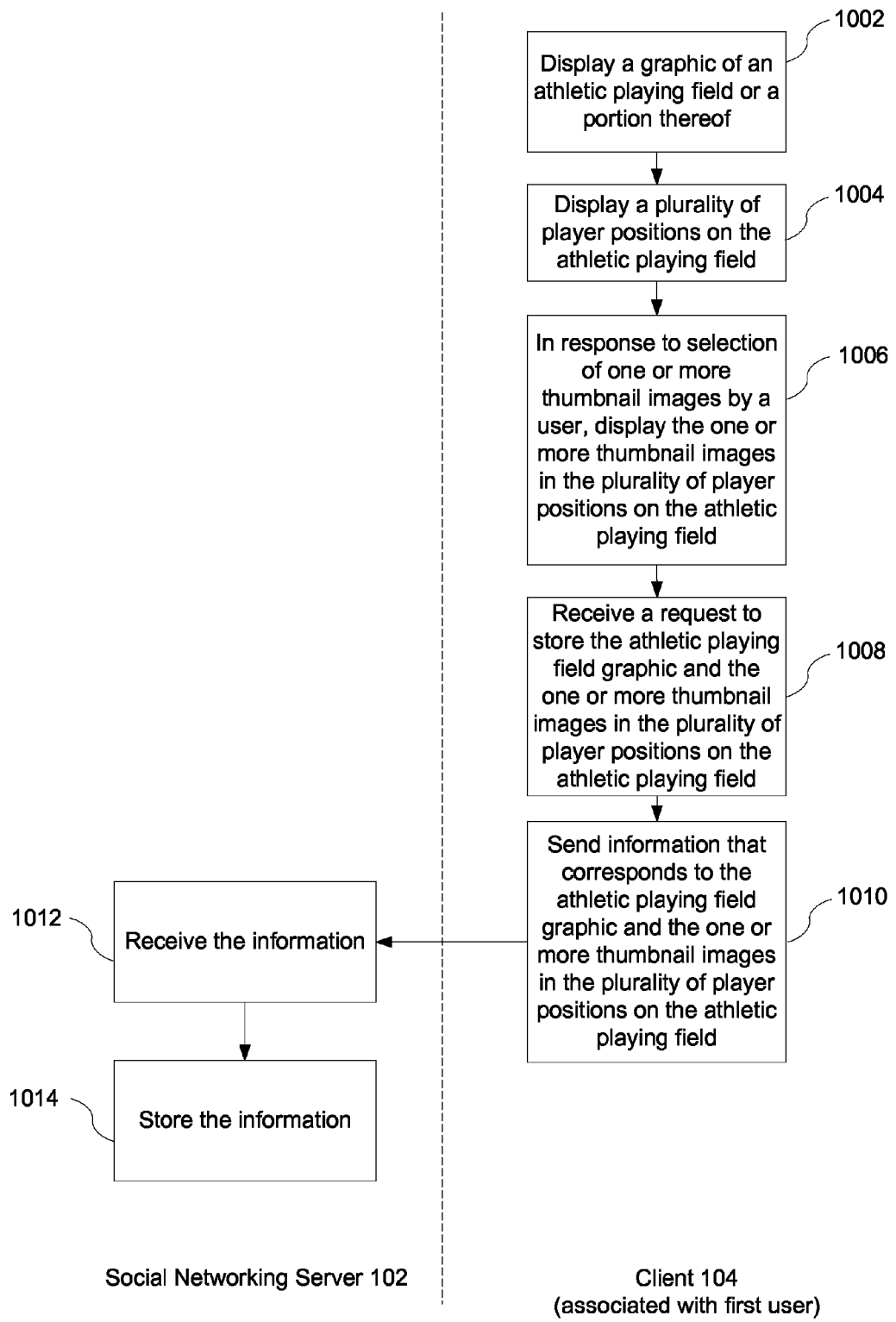
FIG. 10 is a flowchart representing a method of creating a personalized online sports chart in accordance with one embodiment of the present invention.

FIG. 10 is a flowchart representing a method of creating a personalized online sports chart in accordance with one embodiment of the present invention. FIG. 10 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes performed by server 102 can be performed by client 104 using components analogous to those shown for server 102 in FIG. 2.

In some embodiments, client 104 receives login information for the user, such as a username and password, and sends the information to social networking server 102 via communications network 106. Server 102 receives and verifies the login information, thereby enabling server 102 to associate subsequent data received from client 104 (e.g., the personal team(s) 414 selected by the user) with a particular user record 224 in user information database 222.

In response to receiving a user request to create or edit one of the user's personal sports teams (e.g., by the user activating the "Edit my team" icon 648 in GUI 600), client 104 displays a GUI such as that shown in FIG. 7. In some embodiments, client 104 receives information used in GUI 700 from server 102, such as athletic field graphic templates 232, formation templates 234, and information in the user's record 224 (e.g., friends 412 and personal sports team(s) 414), as well as information in the records of other users (e.g., thumbnails 406, player types 410, and/or community ID(s) 408).

Client 104 displays (1002) a graphic of an athletic playing field 724 or a portion thereof. Client 104 also displays (1004) a plurality of player positions 726 on the athletic playing field 724. In response to selection of one or more thumbnail images 714 by a user at client computer 104, client 104 displays (1006) the one or more thumbnail images 714 in the plurality of player positions 726 on the athletic playing field 724. The thumbnail images 714 provide links to corresponding profiles in an online social network.

In some embodiments, the athletic playing field graphic 724, 652 and the one or more thumbnail images 714, 646 in the plurality of player positions 726 on the athletic playing field 724, 652 are displayed as part of the user's page or profile 600 in the online social network.

In some embodiments, client 104 receives (1008) a request to store the athletic playing field graphic 724, 652 and the one or more thumbnail images 714, 646 in the plurality of player positions 726 on the athletic playing field 724, 652 (e.g., by the user selecting save my team icon 732).

In some embodiments, client 104 sends (1010) information to server 102 that corresponds to the athletic playing field graphic 724, 652 and the one or more thumbnail images 714/646 in the plurality of player positions 726 on the athletic playing field 724, 652.

Server 102 receives (1012) and stores (1014) the information (e.g., as personal sport team information 414 such as players-positions 418 and formation 416 in the corresponding user record 224 in user information database 222).

Figure 11:
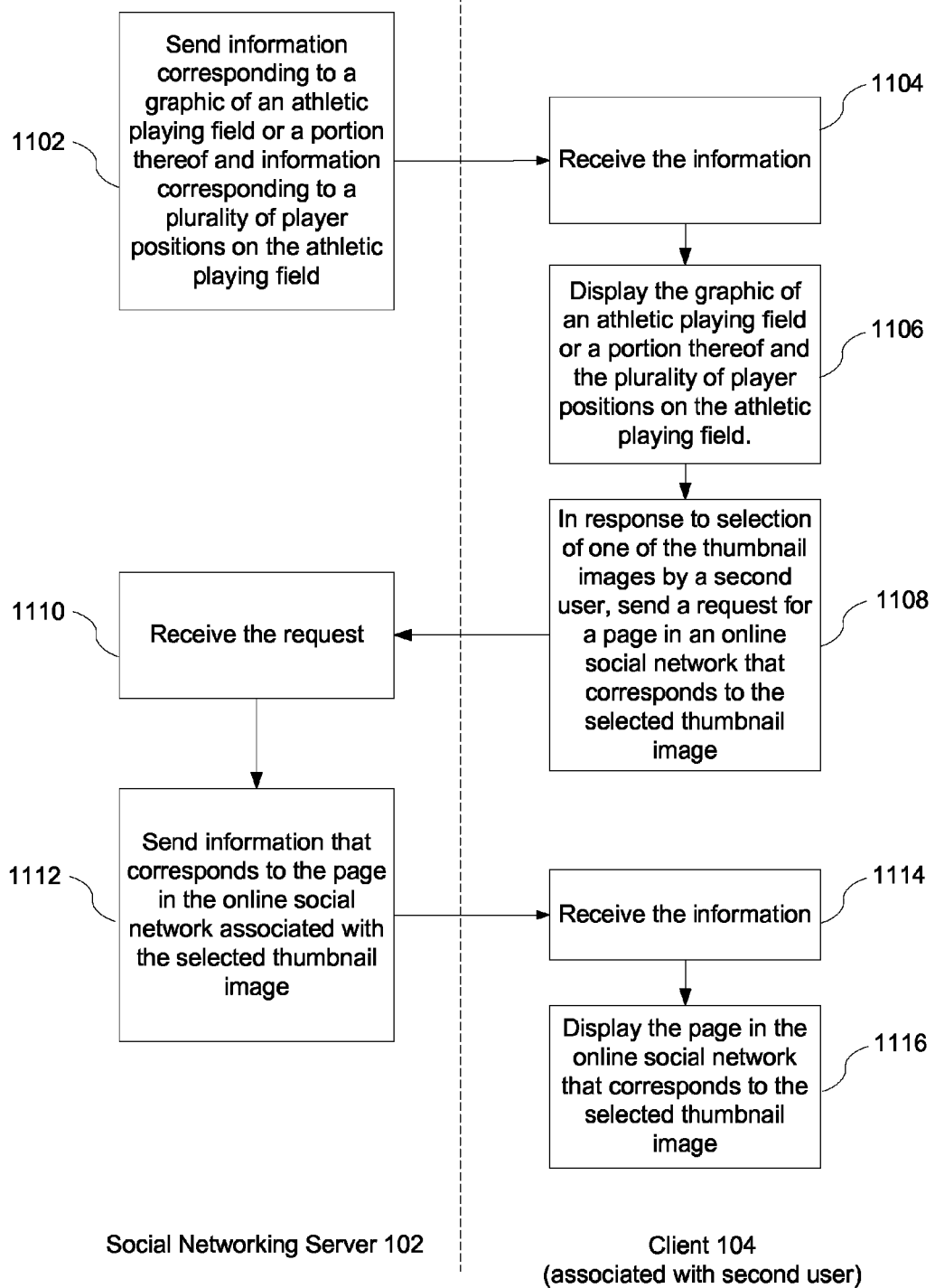
FIG. 11 is a flowchart representing a method of using personalized online sports charts to facilitate online communications with other computer users in accordance with one embodiment of the present invention.

FIG. 11 is a flowchart representing a method of using personalized online sports charts to facilitate online communications with other computer users in accordance with one embodiment of the present invention. FIG. 11 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes performed by server 102 can be performed by client 104 using components analogous to those shown for server 102 in FIG. 2.

Server 102 sends (1102) information 232 corresponding to a graphic of an athletic playing field or a portion thereof. Server 102 also sends (1102) information corresponding to a plurality of player positions 418 on the athletic playing field. At least some of the player positions 418 "contain" (i.e., are assigned or associated with) thumbnail images 646 selected by a first user.

In some embodiments, the athletic playing field graphic, plurality of player positions, and thumbnail images are sent using a single data structure, while in other embodiments they are sent using distinct data structures (e.g., a web page with embedded image tags that reference image files stored on the server 102, and the individual images referenced by the image tags), in which case they are merged during the display process at client 104. In some embodiments, the athletic playing field graphic, plurality of player positions, and thumbnail images are generated by social network engine 220 using data in presentation module 230 and user database 222.

In some embodiments, the information sent that corresponds to the athletic playing field graphic, plurality of player positions, and thumbnail images contains all of the data needed to display the athletic playing field graphic, plurality of player positions, and thumbnail images on client 104. In some embodiments, the information sent that corresponds to the athletic playing field graphic, plurality of player positions, and thumbnail images include pointers to data stored in client 104. The pointers in combination with the data stored in client 104 can be used to display the athletic playing field graphic, plurality of player positions, and thumbnail images in a GUI (e.g., GUI 800) on client 104.

Client 104 receives (1104) the information and displays (1106) the graphic of an athletic playing field or a portion thereof. Client 104 also displays (1106) the plurality of player positions on the athletic playing field. At least some of the player positions contain thumbnail images selected by a first user. In some embodiments, presentation module 320 (FIG. 3A) formats the received information for display.

In response to selection of one of the thumbnail images by a second user at the client computer 104:

Client 104 sends (1108) a request for a page in an online social network that corresponds to the selected thumbnail image;

Server 102 receives (1110) the request and sends (1112) information to the client computer 104 that corresponds to the page in the online social network associated with the selected thumbnail image; and Client 104 receives (1114) the information and displays (1116) a page in the online social network that corresponds to the selected thumbnail image. In some embodiments, the displayed page is a profile of a person who is a member of the online social network.

In some embodiments, the thumbnail is selected by the second user clicking on a predefined region that includes the thumbnail (e.g., clicking down and then up on the thumbnail while cursor 728 is over the thumbnail, or just clicking down on the thumbnail, or just clicking up on the thumbnail), placing (or hovering) cursor 728 over or near the thumbnail for a predetermined period of time (e.g., a mouse-hover), or other activity indicating that the user expects to activate a feature associated with the thumbnail. One of ordinary skill in the art would recognize various ways to identify a user-initiated activity as described above such as by recognizing a click-down event and/or click-up event, or monitoring the movement of the cursor over a period of time. This could be done, for example, by the presentation module 320, client assistant 324 or operating system 310.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A graphical user interface on a computer having one or more processors and memory storing one or more programs that when executed by the one or more processors generate the graphical user interface on a display device of the computer, the graphical user interface comprising:
    a graphic of an athletic playing field or a portion thereof, and
    a plurality of player positions on the athletic playing field,
    wherein at least some of the player positions have superimposed thereon thumbnail images selected by a first user, and
    wherein the thumbnail images provide links which, when selected by a user, provide access to corresponding profiles in an online social network, and
    wherein the athletic playing field graphic and the plurality of player positions containing thumbnail images selected by the first user are viewable by a second user who accesses a page corresponding to the first user, and
    wherein the first user and second user are both members of a same online social network.

2. The graphical user interface of claim 1, wherein the athletic playing field is a soccer field, a baseball field, a football field, a basketball court, or a hockey rink.

3. The graphical user interface of claim 1, wherein the thumbnail images include thumbnail images of individuals.

4. The graphical user interface of claim 1, wherein the thumbnail images include images selected from the group consisting of images of individuals, team logos, and graphic art images.

5. The graphical user interface of claim 1, wherein locations of the plurality of player positions on the athletic playing field can be modified by the first user.

6. The graphical user interface of claim 1, wherein the profiles are of friends of the first user or users in the social network identified as players.

7. The graphical user interface of claim 1, further comprising a bench area adjacent to the playing field that contains a plurality of bench positions.

8. The graphical user interface of claim 1, further comprising a region, apart from the athletic playing field graphic, that contains a plurality of thumbnail images that may be selected by the first user for inclusion in the plurality of the player positions on the athletic playing field.

9. The graphical user interface of claim 8, wherein a thumbnail image in the plurality of thumbnail images that may be selected by the first user for inclusion in the plurality of the player positions on the athletic playing field is selected by dragging and dropping the thumbnail image in a player position in the plurality of player positions.

10. A method implemented on a computer having one or more processors and memory storing one or more programs that when executed by the one or more processors generate information for a graphical user interface, the method comprising: at a server computer,
    sending information corresponding to a graphic of an athletic playing field or a portion thereof;
    sending information corresponding to a plurality of player positions on the athletic playing field;
    wherein the information corresponding to at least some of the player positions includes thumbnail images selected by a first user, and wherein the thumbnail images, when displayed in the graphical user interface, are superimposed upon player positions; and
    in response to selection of one of the thumbnail images by a second user at a client computer, sending to the client computer information that corresponds to a page in an online social network associated with the selected thumbnail image; and
    wherein the first user and second user are both members of a same online social network.

11. A method implemented on a computer having one or more processors and memory storing one or more programs that when executed by the one or more processors generate a graphical user interface on a display device of the computer, the method comprising: at a client computer,
    displaying a graphic of an athletic playing field or a portion thereof;
    displaying a plurality of player positions on the athletic playing field,
    wherein at least some of the player positions have superimposed thereon thumbnail images selected by a first user; and
    in response to selection of one of the thumbnail images by a second user at the client computer, displaying a page in an online social network that corresponds to the selected thumbnail image;
    wherein the first user and second user are both members of a same online social network.

12. The method of claim 11, wherein the displayed page is a profile of a person who is a member of the online social network.

13. A system comprising at least one server having one or more processors and memory storing one or more programs that when executed by the one or more processors generate information for a graphical user interface, wherein the at least one server is configured to:
    send information corresponding to a graphic of an athletic playing field or a portion thereof;
    send information corresponding to a plurality of player positions on the athletic playing field;
    wherein at least some of the player positions have superimposed thereon thumbnail images selected by a first user; and
    in response to selection of one of the thumbnail images by a second user at a client computer, send to the client computer information that corresponds to a page in an online social network associated with the selected thumbnail image; and
    wherein the first user and second user are both members of a same online social network.

14. A non-transitory computer readable storage medium storing one or more programs for execution by one or more processors of a computer system, the one or more programs comprising:
    instructions for sending information corresponding to a graphic of an athletic playing field or a portion thereof;
    instructions for sending information corresponding to a plurality of player positions on the athletic playing field;
    wherein at least some of the player positions have superimposed thereon thumbnail images selected by a first user; and
    instructions for responding to selection of one of the thumbnail images by a second user at a client computer, by sending to the client computer information that corresponds to a page in an online social network associated with the selected thumbnail image; and wherein the first user and second user are both members of a same online social network.

15. A server computer having one or more processors and memory storing one or more programs that when executed by the one or more processors generate information for a graphical user interface, the server computer comprising:
   means for sending information corresponding to a graphic of an athletic playing field or a portion thereof;
   means for sending information corresponding to a plurality of player positions on the athletic playing field;
   wherein at least some of the player positions have superimposed thereon thumbnail images selected by a first user; and
   means for sending additional information to a client computer in response to selection of one of the thumbnail images by a second user at the client computer, the additional sent information corresponding to a page in an online social network associated with the selected thumbnail image; and
   wherein the first user and second user are both members of a same online social network.

16. The non-transitory computer readable storage medium of claim 14, wherein the athletic playing field is a soccer field, a baseball field, a football field, a basketball court, or a hockey rink.

17. The non-transitory computer readable storage medium of claim 14, wherein the thumbnail images include thumbnail images of individuals.

18. The non-transitory computer readable storage medium of claim 14, wherein the thumbnail images include images selected from the group consisting of images of individuals, team logos, and graphic art images.

19. The non-transitory computer readable storage medium of claim 14, wherein locations of the plurality of player positions on the athletic playing field can be modified by the first user.

20. The method of claim 10, wherein the athletic playing field is a soccer field, a baseball field, a football field, a basketball court, or a hockey rink.

21. The method of claim 10, wherein the thumbnail images include thumbnail images of individuals.

22. The method of claim 10, wherein the thumbnail images include images selected from the group consisting of images of individuals, team logos, and graphic art images.

23. The method of claim 10, wherein locations of the plurality of player positions on the athletic playing field can be modified by the first user.

24. The system of claim 13, wherein the athletic playing field is a soccer field, a baseball field, a football field, a basketball court, or a hockey rink.

25. The system of claim 13, wherein the thumbnail images include thumbnail images of individuals.

26. The system of claim 13, wherein the thumbnail images include images selected from the group consisting of images of individuals, team logos, and graphic art images.

27. The system of claim 13, wherein locations of the plurality of player positions on the athletic playing field can be modified by the first user.

28. A graphical user interface on a computer having one or more processors and memory storing one or more programs that when executed by the one or more processors generate the graphical user interface on a display device of the computer, the graphical user interface comprising:
   a graphic of a personal team area, and
   a plurality of player positions in the personal team area,
   wherein at least some of the player positions have superimposed thereon thumbnail images selected by a first user, and
   wherein the thumbnail images provide links which, when selected by a user, provide access to corresponding profiles in an online social network, and
   wherein the graphic of the personal team area and the plurality of player positions containing thumbnail images selected by the first user are viewable by a second user who accesses a page corresponding to the first user, and
   wherein the first user and second user are both members of a same online social network.

\* \* \* \* \*